United States Patent
Martin et al.

(10) Patent No.: US 11,551,402 B1
(45) Date of Patent: Jan. 10, 2023

(54) SYSTEMS AND METHODS FOR DATA VISUALIZATION IN VIRTUAL REALITY ENVIRONMENTS

(71) Applicant: FMR LLC, Boston, MA (US)

(72) Inventors: David Martin, Boston, MA (US); Adam Schouela, Boston, MA (US); Jason Mcevoy, Boston, MA (US)

(73) Assignee: FMR LLC, Boston, MA (US)

(*) Notice: Subject to any disclaimer, the term of this patent is extended or adjusted under 35 U.S.C. 154(b) by 0 days.

(21) Appl. No.: 17/380,757

(22) Filed: Jul. 20, 2021

(51) Int. Cl.
| | | |
|---|---|---|
| *G06T 15/00* | (2011.01) | |
| *G06F 1/16* | (2006.01) | |
| *G06T 3/40* | (2006.01) | |

(52) U.S. Cl.
CPC ............ *G06T 15/005* (2013.01); *G06F 1/163* (2013.01); *G06T 3/4053* (2013.01)

(58) Field of Classification Search
CPC ...... G06T 15/005; G06T 3/4053; G06F 1/163
See application file for complete search history.

(56) References Cited

U.S. PATENT DOCUMENTS

| | | | | |
|---|---|---|---|---|
| 9,870,629 | B2* | 1/2018 | Cardno | G06Q 10/10 |
| 10,434,418 | B2* | 10/2019 | Dauphiny | A63F 13/352 |
| 10,825,236 | B1* | 11/2020 | Vorobyov | G06T 19/006 |
| 2004/0032410 | A1* | 2/2004 | Ryan | G06T 15/20 345/427 |
| 2014/0247271 | A1* | 9/2014 | Fernandez | G06F 9/451 345/589 |
| 2017/0092008 | A1* | 3/2017 | Djorgovski | G06T 15/205 |
| 2017/0329515 | A1* | 11/2017 | Clement | G06F 3/04815 |
| 2018/0276897 | A1 | 9/2018 | Zhang et al. | |
| 2019/0212828 | A1* | 7/2019 | Kin | G06F 3/04815 |
| 2019/0347837 | A1* | 11/2019 | Donalek | G06T 17/20 |
| 2020/0005026 | A1* | 1/2020 | Andersen | G06V 40/113 |
| 2020/0045491 | A1* | 2/2020 | Robinson | H04R 5/033 |
| 2020/0126308 | A1* | 4/2020 | Moroze | G06T 19/20 |
| 2020/0126309 | A1* | 4/2020 | Moroze | G06F 3/011 |
| 2020/0371673 | A1* | 11/2020 | Faulkner | G06F 3/04842 |
| 2021/0112361 | A1* | 4/2021 | Mindlin | H04S 7/303 |
| 2021/0383551 | A1* | 12/2021 | Fiala | G02B 27/0093 |

\* cited by examiner

*Primary Examiner* — Yu Chen
(74) *Attorney, Agent, or Firm* — Cesari and McKenna, LLP (57) ABSTRACT

A computer-implemented method is provided for visualizing multiple objects in a computerized visual environment. The method includes displaying to a user a virtual three-dimensional space via a viewing device worn by the user, and determining a data limit of the viewing device for object rendering. The method includes presenting an initial rendering of the objects within the virtual space, where the visualization data used for the initial rendering does not exceed the data limit of the viewing device. The method also includes tracking user attention relative to the objects as the user navigates through the virtual space and determining, based on the tracking of user attention, one or more select objects from the multiple objects to which the user is paying attention. The one or more select objects are located within a viewing range of the user.

20 Claims, 4 Drawing Sheets

SYSTEMS AND METHODS FOR DATA VISUALIZATION IN VIRTUAL REALITY ENVIRONMENTS

TECHNICAL FIELD

This application relates generally to methods and apparatuses for visualizing objects in a computerized visual environment (e.g., a virtual or augmented reality environment) while taking into account of the limited capabilities of the viewing devices.

BACKGROUND

In recent years, hardware such as headsets, adapters, and viewers used in virtual reality or augmented reality environments have become widely available. In the case of virtual reality (VR), a user sees a visual environment comprised of computer-generated graphical objects and in the case of augmented reality (AR) or mixed reality (MR), a user sees a visual environment comprised of both real-world objects and computer-generated graphics.

In general, a virtual environment provides a user with a comprehensive space to visualize data as graphical objects. However, in some cases, the amount of data that requires visualization can exceed the data limit of the viewing device worn by a user for visualization, such as a headset that enables VR, AR and MR experiences. Therefore, systems and methods are needed to maximize the user's viewing experience in a computerized virtual environment while avoid overloading the viewing device.

SUMMARY

The invention, in one aspect, features a computer-implemented method for visualizing a plurality of objects in a computerized visual environment. Each of the plurality of objects is represented by a set of visualization data usable to provide three-dimensional visualization of the corresponding object in the computerized visual environment. The method includes displaying to a user, by a computing device, a virtual three-dimensional space via a viewing device worn by the user and determining, by the computing device, a data limit of the viewing device for object rendering. The method also includes presenting, by the computing device, an initial rendering of the plurality of objects within the virtual space utilizing a portion of the visualization data representing the plurality of objects. The visualization data used for the initial rendering does not exceed the data limit of the viewing device. The method also includes tracking, by the computing device, user attention relative to the plurality of objects as the user navigates through the virtual space and determining, by the computing device, based on the tracking of user attention, one or more select objects from the plurality of objects to which the user is paying attention. The one or more select objects are located within a viewing range of the user. The method further includes dynamically rendering, by the computing device, (i) the one or more select objects as three-dimensional objects using the visualization data and (ii) one or more remaining objects from the plurality of objects in a simpler resolution compared to the rendering of the select objects such that not all visualization data for each remaining object is used in the dynamic rendering. The visualization data used to render both the one or more select objects and the one or more remaining objects does not exceed the data limit of the viewing device The invention, in another aspect, features a computerized system for visualizing a plurality of objects in a computerized visual environment. Each of the plurality of objects is represented by a set of visualization data usable by the computerized system to provide three-dimensional visualization of the corresponding object in the computerized visual environment. The system includes a viewing device that displays, to a user wearing the viewing device, a virtual three-dimensional space. The viewing device has a data limit for object rendering. The system also includes a computing device in electrical communication with the viewing device. The computing device includes a visualization module configured to present, via the viewing device of the user, an initial rendering of the plurality of objects within the virtual space utilizing a portion of the visualization data representing the plurality of objects. The computing device also includes a tracking module configured to track user attention relative to the plurality of objects as the user navigates through the virtual space. The computing device further includes a computation module configured to determine based on the tracking of user attention by the tracking module one or more select objects from the plurality of objects to which the user is paying attention and cause the visualization module to dynamically render (i) the one or more select objects as three-dimensional objects using the visualization data and (ii) one or more remaining objects from the plurality of objects in a simpler resolution compared to the rendering of the select objects such that not all visualization data for each remaining object is used in the dynamic rendering. The visualization data used to render both the one or more select objects and the one or more remaining objects does not exceed the data limit of the viewing device Any of the above aspects can include one or more of the following features. In some embodiments, the initial rendering comprises each of the plurality of objects rendered in the simpler resolution. In some embodiments, the simpler resolution for rendering a remaining object comprises rendering the remaining object using only a portion of the visualization data of that object. The simpler resolution for rendering a remaining object can comprise a two-dimensional rendering of the object or a coarse three-dimensional rendering of the object. The simpler resolution for rendering a remaining object can comprise not rendering the remaining object at all. In some embodiments, rendering the one or more select objects as three-dimensional objects comprises rendering each of the select objects using all of the visualization data of that object.

In some embodiments, the system and method are configured to continuously monitor user attention and determine, as the user navigates through the virtual space, (i) the one or more select objects to be rendered in three dimensions and (ii) the one or more remaining objects to be rendered in the simpler resolution.

In some embodiments, tracking the attention of the user relative to the plurality of objects comprises computing a distance between each of the plurality of objects and the user in the virtual space. In this case, determining the one or more select objects for three-dimensional rendering can comprise determining that (i) the computed distance of each select object relative to the user is within a threshold distance that indicates proximity to the user and (ii) the select object is within the viewing range of the user.

In some embodiments, tracking the attention of the user relative to the plurality of objects comprises monitoring by the viewing device a gaze path of the user. In this case, determining the one or more select objects for three-dimensional rendering comprises determining that each select object is on the gaze path of the user for a time period exceeding a predefined threshold.

In some embodiments, tracking the attention of the user relative to the plurality of objects comprises monitoring by the viewing device a direction of audio signal received by the user via the viewing device and detecting by the viewing device a head turn of the user in the direction of the audio signal. In this case, determining the one or more select objects for three-dimensional rendering comprises determining that each select object is along the direction of the head turn.

In some embodiments, tracking the attention of the user relative to the plurality of objects comprises monitoring by the viewing device or a handheld device of the user a direction of gesture by the user. In this case, determining the one or more select objects for three-dimensional rendering comprises determining that each select object is along the direction of gesture.

In some embodiments, tracking the attention of the user relative to the plurality of objects comprises a combination of two or more of monitoring (i) a distance between each of the plurality of objects and the user in the virtual space, (ii) a gaze path of the user, (iii) a direction of audio signal received by the user, or (iv) a direction of gesture by the user. In this case, determining the one or more select objects for three-dimensional rendering comprises determining two or more of (i) the distance of each select object relative to the user is within a threshold distance and the select object is within the viewing range of the user, (ii) each select object is on the gaze path of the user for a time period exceeding a predefined threshold, (iii) each select object is along the direction of the audio signal, or (iv) each select object is along the direction of gesture.

In some embodiments, the system and method are configured to monitor the data limit of the viewing device to determine the one or more select objects and the one or more remaining objects for rendering. In some embodiments, the data limit of the viewing device is determined based on a frames-per-second capability of the view device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
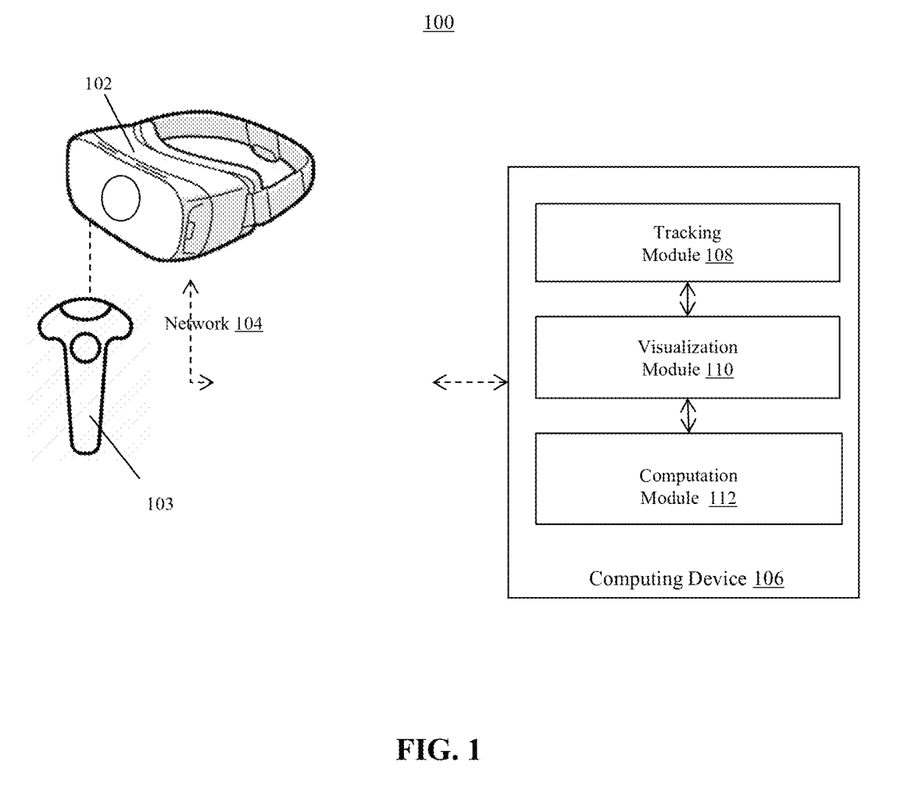
FIG. 1 is a block diagram of a system for visualizing data as graphical objects in a computerized visual environment.

FIG. 1 is a block diagram of a system 100 for visualizing data as graphical objects in a computerized visual environment. The system 100 includes a viewing device 102, a communications network 104, and a computing device 106 that includes a tracking module 108, a visualization module 110, and a computation module 112.

The viewing device 102 enables a user to view computerized visual content, such as graphics, video, and related user interface elements in AR, VR, or MR environments. In some embodiments, the system 100 also includes a handheld device 103, such as a controller, that is configured to sense and capture motions of the user's hands as he or she moves within a physical environment. In some embodiments (as shown in FIG. 1), the viewing device 102 is a headset that a user wears to interact with the computerized visual content. In these embodiments, the headset 102 and/or the handheld device 103 are equipped with circuitry to, e.g., detect and track movement of the user's head/body and the user's hands. The viewing device 102 and the handheld device 103 can be electrically and/or mechanically coupled together via a network connection. Exemplary headsets 102 include, but are not limited to, the Meta 2™ AR headset available from Meta Company of San Mateo, Calif.; the VIVE™ VR System available from HTC Corporation of Taiwan; and the HoloLens™ available from Microsoft Corporation of Seattle, Wash. Exemplary handheld devices 103 include, but are not limited to, the VIVE™ VR System available from HTC Corporation of Taiwan and the Oculus Rift™ controllers available from Facebook, Inc. of Menlo Park, Calif. It should be appreciated that other embodiments of the viewing device 102 and handheld device 203 can be used within the scope of invention described herein. For example, in some embodiments, the functionalities of the viewing device 102 and the handheld device 103 are integrated in a single physical device, such as a headset with integrated motion sensor to track a user's hand movement.

The viewing device 102 and the optional handheld device 103 are configured to connect to the communications network 104 to communicate with the computing device 106 for providing input and receiving output in relation to performing data visualization in a computerized visual environment as described herein. The network 104 is typically a wide area network, such as the Internet and/or a cellular network. In some embodiments, the network 104 is comprised of several discrete networks and/or sub-networks (e.g., cellular to Internet). In some embodiments, the viewing device 102 and handheld device 103 can connect to the computing device 106 via a physical connection (e.g., cable).

The computing device 106 is a device including specialized hardware and/or software modules that execute on a processor and interact with memory modules of the server computing device 106, to receive data from other components of the system 100, transmit data to other components of the system 100, and perform functions relating to providing data visualization functions in a computerized visual environment as described herein. The computing device 106 includes several computerized modules 108, 110, 112 that execute on the processor of the server computing device 106. In some embodiments, the modules 108, 110, 112 are specialized sets of computer software instructions programmed onto one or more dedicated processors in the computing device 106 and can include specifically designated memory locations and/or registers for executing the specialized computer software instructions.

Although the modules 108, 110, 112 are shown in FIG. 1 as executing within the same computing device 106, in some embodiments the functionality of the modules 108, 110, 112 can be distributed among a plurality of computing devices. As shown in FIG. 1, the computing device 106 enables the modules 108, 110, 112 to communicate with each other to exchange data for performing the described functions. It should be appreciated that any number of computing devices, arranged in a variety of architectures, resources, and configurations (e.g., cluster computing, virtual computing, cloud computing) can be used without departing from the scope of the invention. The exemplary functionality of each of the modules 108, 110, 112 is described in detail below.

Also, it should be appreciated that, in some embodiments, the processing performed by the computing device 106 can be incorporated with the viewing device 102 and/or the handheld device 103. For example, a headset can include an embedded processor and memory that is programmed with modules 108, 110, 112 to perform the functions described herein.

Figure 2:
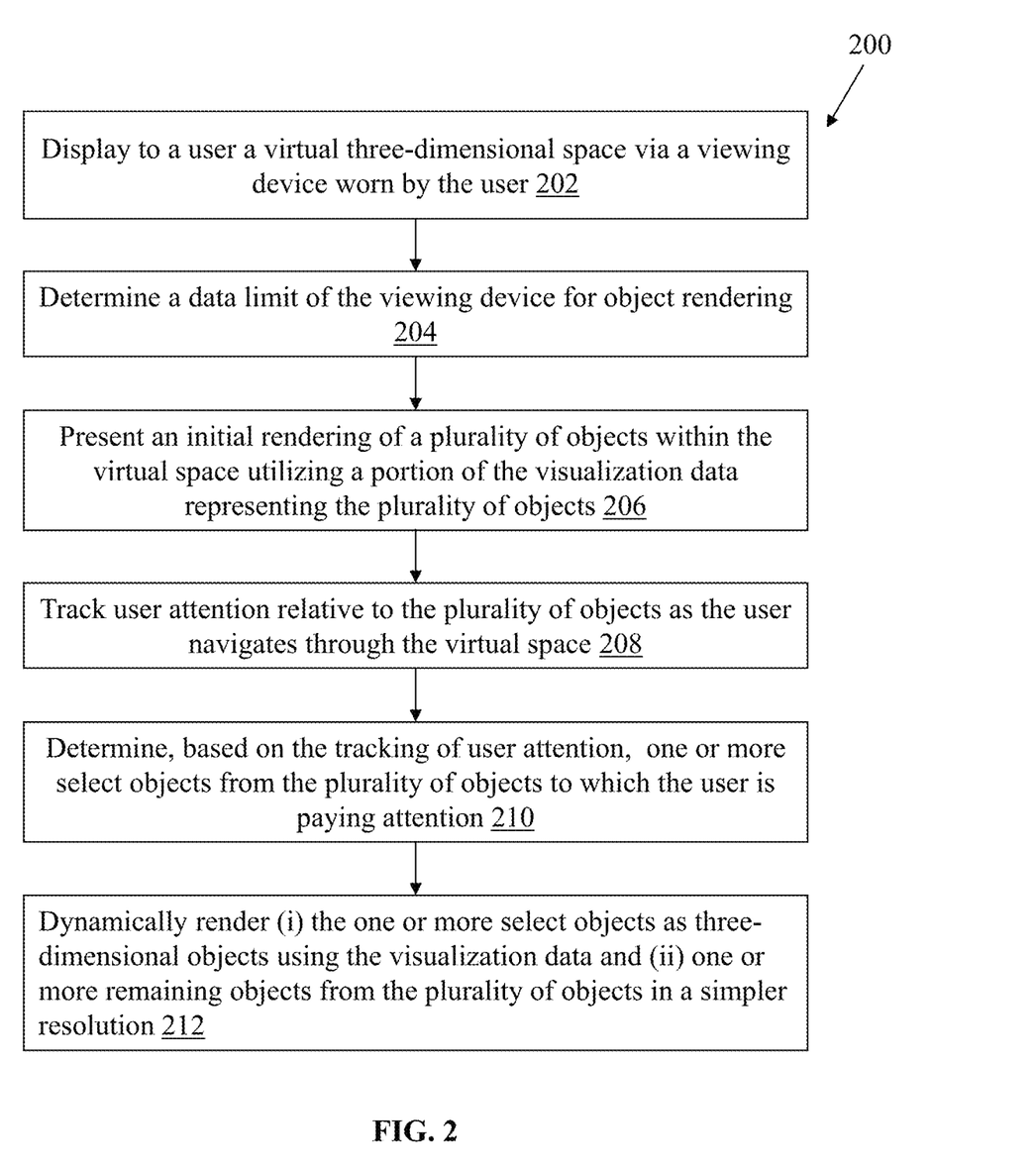
FIG. 2 is a flow diagram of a computerized method for visualizing data as graphical objects in a computerized visual environment using the system of FIG. 1.

FIG. 2 is a flow diagram of a computerized method 200 for visualizing data as graphical objects in a computerized visual environment using the system 100 of FIG. 1. At step 202, a user wearing a viewing device 102 and holding the handheld device 103 as described above is presented with a computerized virtual three-dimensional space via the user's viewing device 102. Such visualization can be provided by the visualization module 110 of the computing device 106.

The visualization module 110, in conjunction with the computing module 112, is also configured to display to the viewer within the virtual environment certain graphical content of interest to the user, including a set of one or more desired graphical objects. In general, a virtual object can be visualized as a polygon mesh (such as a triangular mesh) with a collection of vertices, edges and faces that defines the shape and contour of the object in three dimensions. Thus, the computing device 106 can store a set of visualization data (e.g., mesh data) corresponding to each object that is usable by the visualization module 110 to provide full three-dimensional visualization of that object. However, it is well known that a viewing device 102 has a data limit for object rendering that limits the number of meshes of objects capable of being displayed in a virtual space. This limit differs from viewing device to viewing device depending on the capability of the viewing device. Further, the more polygon meshes there are, the harder the viewing device 102 needs to work to render them. Thus, to provide effective rendering of the objects desired by a user, the computing module 112 is configured to first determine the data limit associated with the viewing device 102 of the user (at step 204). For example, the data limit of the viewing device 102 can be determined based on a frames-per-second capability of the view device 102.

Figure 3:
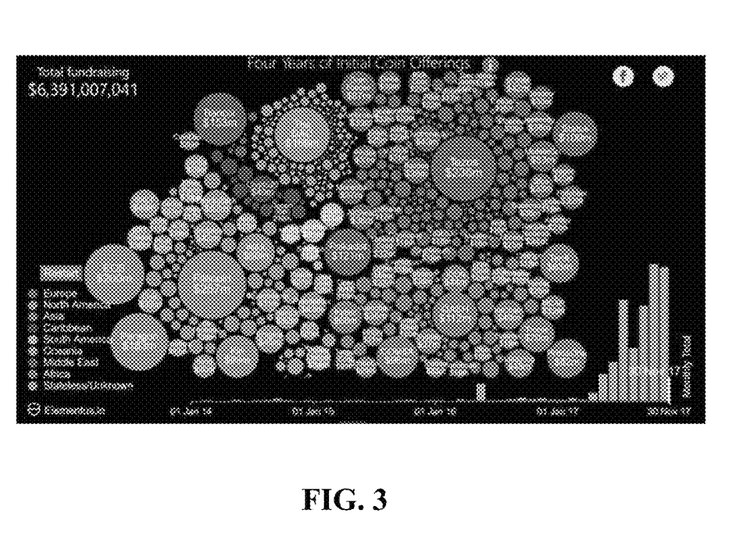
FIG. 3 shows an exemplary initial rendering of multiple objects in a two-dimensional chart.
Figures 4A, 4B:
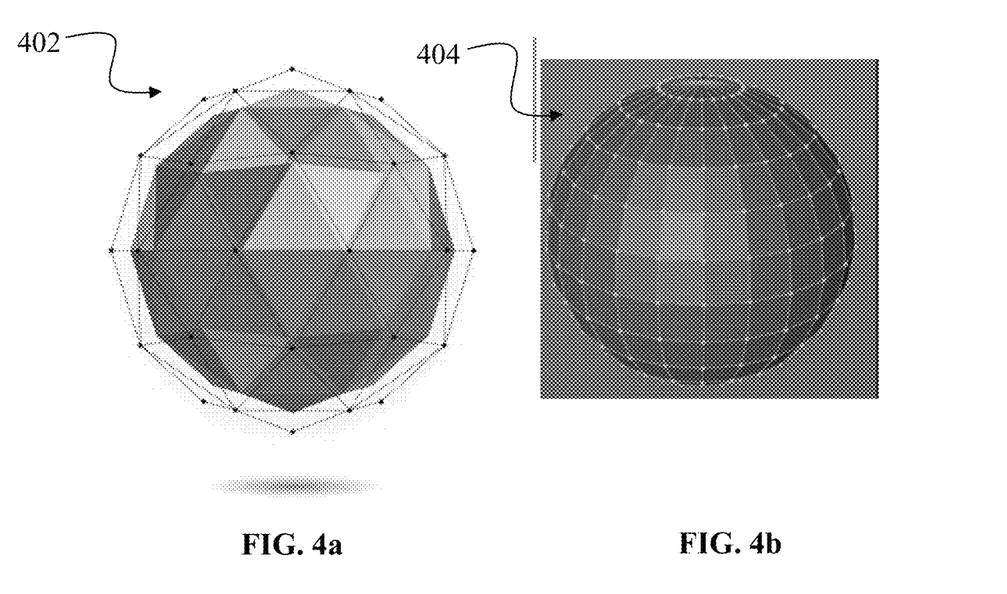
FIGS. 4a and 4b show an exemplary simple three-dimensional representation of a spherical object and a more refined three-dimensional representation of the same spherical object, respectively.

Based on the data limit determined, the visualization module 110 can present an initial rendering of the objects within the three-dimensional virtual space, where the initial rendering does not exceed the data limit of the view device (step 206). For example, if the combined data of the desired graphical objects does not exceed the data limit of the viewing device 102, the visualization module 110 can provide full three-dimensional rendering of all the objects using the entire data set of each object. However, if the combined data of the desired objects exceed the data limit, the visualization module 110 can choose to render only a portion of the visualization data for each object. For example, the visualization module 110 can render all or a subset of the objects in a dimension less than three dimensions, such as in two dimensions. FIG. 3 shows an exemplary initial rendering of multiple objects in a two-dimensional chart. In another example, the initial rendering of an object is a simple three-dimensional representation of the object based on a subset of the object's visualization data, where the simple three-dimensional rendering is courser than the more refined three-dimensional rendering that can be achieved using the full visualization data set. FIGS. 4*a* and 4*b* show an exemplary simple three-dimensional representation 402 of a spherical object and a more refined three-dimensional representation 404 of the same spherical object, respectively. The simple three-dimensional representation 402 can be achieved by using a subset of the visualization data used to render the more refined three-dimensional representation 404.

The tracking module 108 of the computing device 106 is configured to track the attention of the user relative to the objects displayed in the initial rendering as the user navigates through the virtual space (step 208). For example, the viewing device 102 can be a headset that is eye tracking enabled, where the headset includes a camera that determines a direction of gaze of the user using, for example, the Unity3D™ development platform with the Physics Raycast tool. In one example, the attention of the user being tracked by the tracking module 108 is the gaze of the user. In another example, the tracking module 108, in conjunction with the viewing device 102, determines the distance of the user relative to each object initially rendered and/or whether each object is within a viewing range of the user. Thus, in this example, the attention of the user being tracked by the tracking module 108 is proximity based. In yet another example, the viewing device 102 can be a headset that is spatial-audio tracking enabled, where the headset includes a microphone that determines a direction of audio signal received by the headset and a camera that detects a head turn of the user in the direction of the incoming audio signal. Thus, in this example, the user attention being tracked by the tracking module 108 is audio based. In yet another example, the tracking module 108, in connection with the viewing device 102 and/or the handheld device 103, determines a direction of hand gesture made by the user. Thus, in this example, the user attention being tracked by the tracking module 108 is hand-motion based. In some embodiments, the tracking module 108 is configured to track a combination of the different types of user attention described above. For example, the tracking module 108 can track two or more of a user gaze path, user audio response, user gesturing direction and user proximity to objects.

At step 210, based on the user attention tracked at step 208 by the tracking module 108, the computation module 112 is configured to determine one or more select objects (from the group of objects of initial interest to the user) that the user is currently paying attention to. In some embodiments, the select objects are all within a viewing range of the user at the time of the tracking (e.g., the objects are not behind the user). Specifically, for the case where the user gaze path is tracked, each object selected by the computation module 112 constitutes an object that is on the gaze path of the user for a time period exceeding a predefined length of time. This indicates that the object is being focused on by the user. For the case where the user proximity to objects is tracked, each object selected by the computation module 112 constitutes an object whose relative distance to the user is within a predefined threshold distance and is visible to the user at the time of the tracking. This indicates that the object is close to the user and is more likely to be focused on by the user. For the case where user audio response is tracked, each object selected by the computation module 112 constitutes an object on the path of the user's head turn in response to an audio signal received by the user. For the case where user gesturing is tracked, each object selected by the computation module 112 constitutes an object that is on the path of a hand gesture/motion by the user. In some embodiments, the computation module 112 determines these select objects using a combination of two or more of the approaches described above. For example, the objects selected can be determined based on two or more of (i) the distance of each select object relative to the user is within a threshold distance and the select object is within the viewing range of the user, (ii) each select object is on the gaze path of the user for a time period exceeding a predefined threshold, (iii) each select object is along the direction of the audio signal, or (iv) each select object is along the direction of gesture.

At step 212, the visualization module 110 is configured dynamically render the select objects (from step 210) as full three-dimensional objects using the full set of visualization data corresponding to each of the select objects. Further, the visualization module 110 is configured to visualize the remaining objects from the initial group of objects in a simpler resolution compared to the rendering of the select objects such that not all full set of visualization data for each remaining object is used in the dynamic rendering. In some embodiments, the simpler resolution for rendering a remaining object involves using only a portion of the visualization data of that object, such as rendering the remaining object as a two-dimensional object (e.g., shown in FIG. 3) or a coarse three-dimensional object (e.g., shown in FIG. 4a). Alternatively, the simpler resolution for rendering a remaining object comprises not rendering the remaining object at all.

In some embodiments, the rendering of the select objects and the remaining objects need to satisfy the constraint that the overall rendering does not exceed the data limit of the viewing device 102 (determined at step 204). For example, if the computation module 112 determines that rendering the combination of select objects and remaining objects would still exceed the data limit of the viewing device 102, the computation module 112 can reduce the number of objects classified as select objects and render than as remaining objects to satisfy the data limit constraint. This further reduction of the group of select objects can be based on, for instance, the distance of the select objects to the viewer, with the select objects farthest from the user being removed first from the group. In some embodiments, the computation module 112 can add additional attention-based constraints to limit the number of select objects in compliance with the data limit of the user's viewing device 102. In some embodiments, the computation module 112 can choose not to render one or more of the remaining objects at all to save bandwidth, where these remaining objects can be objects that are farthest from the viewer.

In some embodiments, the tracking module 108 is configured to continuously or periodically track one or more of the user attention and the data limit of the viewing device 102 worn by the user as the user navigates through the virtual space. If at least one change is detected in user attention or data limit, the tracking module 108 can interact with the computation module 112 to update the determination of select objects to be rendered in full three dimensions and the remaining objects to be rendered in a simpler resolution (i.e., execute step 210 to satisfy the changed conditions). The visualization module 110 can then dynamically visualize the updated categories of select and remaining objects if an attention change of the user and/or data limit change of the viewing device 102 is detected (i.e., execute step 212). The change in attention monitored can be one or more of the different types of attention described above, such as change in attention based on proximity, gaze, audio response and/or gesture. In some embodiments, such continuous or periodical tracking and rendering are performed until the user completes his or her VR, AR or MR session.

Figure 5:
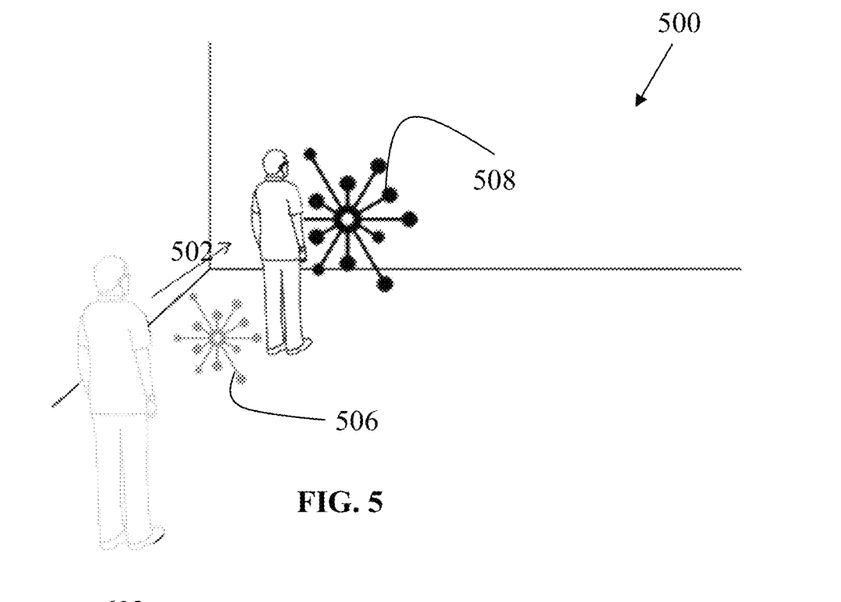
FIG. 5 illustrates an example of updating the visual rendering of an object in virtual space based on a change in user attention detected by the system of FIG. 1 using the method of FIG. 2.
Figure 6:
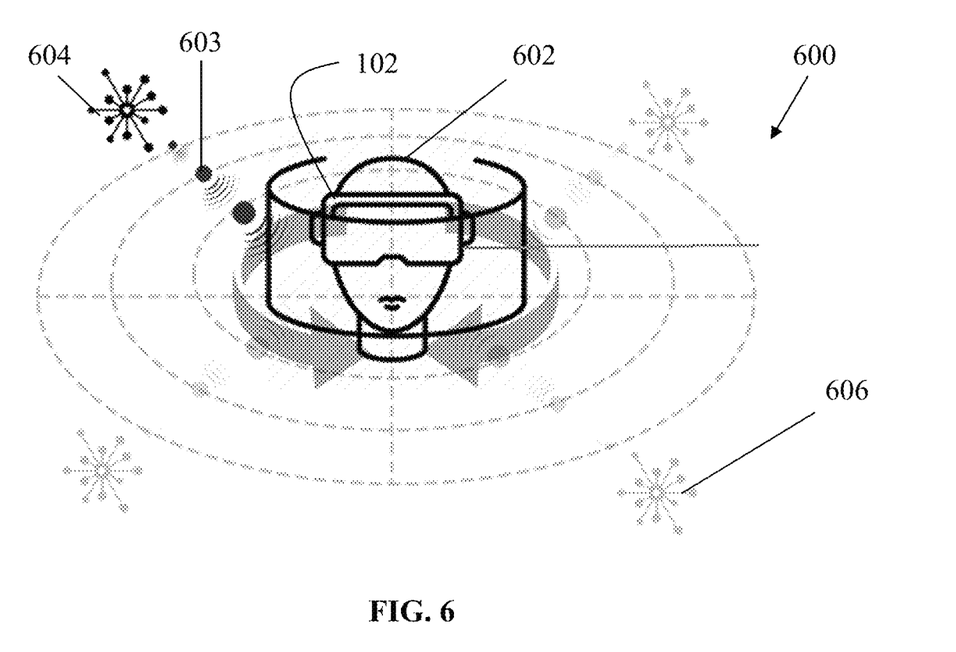
FIG. 6 illustrates another example of updating the visual rendering of an object in virtual space based on a change in user attention detected by the system of FIG. 1 using the method of FIG. 2.

FIG. 5 illustrates an example of updating the visual rendering of an object in virtual space 500 based on a change in user attention detected by the system 100 of FIG. 1 using the method 200 of FIG. 2. As shown, if the computing device 106 detects that the distance 502 between a user and a previously determined remaining object 506 is reduced to within a predetermined threshold distance, which suggests that the user has moved closer to the remaining object 506, the computing device 106 can remove the simple rendering (e.g., a two-dimensional rendering) of the remaining object 506 and instead render it as a select object 508 using its full three-dimensional dataset. FIG. 6 illustrates another example of updating the visual rendering of an object in virtual space 600 based on a change in user attention detected by the system 100 of FIG. 1 using the method 200 of FIG. 2. As shown, the computing device 106 can detect a head turn of the user 602 in response to a direction of audio signal 603 received by the user's headset 102. In response, the computing device 106 is configured to determine if there are one or more objects 604 that are on the head turn path of the user 602 and render these objects 604 as select objects using their full three-dimensional dataset. The other objects 606 in the virtual space 600 are classified as remaining objects and are rendered in a simpler resolution. As yet another example (not illustrated), if the computing device 106 detects that the user has removed his or her gaze from a previously determined gaze path, the computing device 106 can remove the full 3D-rendered selected objects and instead render these objects as remaining objects in a simpler resolution. Further, if the computing device 106 detects that the user's attention has returned to an object that was previously rendered in a simple resolution as a remaining object, the computing device 106 can update the rendering of the object to fully three-dimensional as a select object.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for visualizing a plurality of objects in a computerized visual environment, each of the plurality of objects being represented by a set of visualization data usable to provide three-dimensional visualization of the corresponding object in the computerized visual environment, the method comprising:
    displaying to a user, by a computing device, a virtual three-dimensional space via a viewing device worn by the user;
    determining, by the computing device, a data limit of the viewing device for object rendering;
    presenting, by the computing device, an initial rendering of the plurality of objects within the virtual space, wherein the initial rendering comprises each of the objects rendered in a simple resolution such that not all visualization data for the object is used in the initial rendering and the visualization data used for the initial rendering does not exceed the data limit of the viewing device;
    tracking, by the computing device, user attention relative to the plurality of objects as the user navigates through the virtual space, wherein tracking the user attention comprises computing a distance between each of the plurality of objects and the user in the virtual space and a viewing range of the user;
    automatically determining, by the computing device, based on the tracking of user attention, from the plurality of objects a plurality of select objects to which the user is paying attention, the plurality of select objects being located within the viewing range of the user for a time period exceeding a predefined length of time threshold and the computed distance of each select object relative to the user being within a threshold distance that indicates proximity to the user;
    dynamically rendering, by the computing device, (i) a set of the select objects as full three-dimensional objects using all the visualization data corresponding to each of the select objects and (ii) a set of remaining objects from the plurality of objects in the simple resolution compared to the rendering of the select objects such that not all visualization data for each remaining object is used in the dynamic rendering; and
    adding objects to or removing objects from the set of select objects in compliance with the data limit to ensure that the visualization data used for the dynamic rendering of both the set of select objects and the set of remaining objects does not exceed the data limit of the viewing device.

2. The method of claim 1, wherein the simple resolution for rendering a remaining object comprises rendering the remaining object using only a portion of the visualization data of that object.

3. The method of claim 2, wherein the simple resolution for rendering a remaining object comprises a two-dimensional rendering of the object or a coarse three-dimensional rendering of the object.

4. The method of claim 1, wherein the simple resolution for rendering a remaining object comprises not rendering the remaining object at all.

5. The method of claim 1, further comprising continuously monitoring user attention and determining, as the user navigates through the virtual space, (i) the set of select objects to be rendered in three dimensions and (ii) the set of remaining objects to be rendered in the simple resolution.

6. The method of claim 1, wherein tracking the attention of the user relative to the plurality of objects comprises monitoring by the viewing device a gaze path of the user.

7. The method of claim 6, wherein determining the one or more select objects for three-dimensional rendering comprises determining that each select object is on the gaze path of the user for the time period exceeding the predefined threshold and the computed distance of each select object relative to the user is within the threshold distance that indicates proximity to the user.

8. The method of claim 1, wherein tracking the attention of the user relative to the plurality of objects comprises monitoring by the viewing device a direction of audio signal received by the user via the viewing device and detecting by the viewing device a head turn of the user in the direction of the audio signal.

9. The method of claim 8, wherein determining the one or more select objects for three-dimensional rendering comprises determining that each select object is along the direction of the head turn and the computed distance of each select object relative to the user is within the threshold distance that indicates proximity to the user.

10. The method of claim 1, wherein tracking the attention of the user relative to the plurality of objects comprises monitoring by the viewing device or a handheld device of the user a direction of gesture by the user.

11. The method of claim 10, wherein determining the one or more select objects for three-dimensional rendering comprises determining that each select object is along the direction of gesture and the computed distance of each select object relative to the user is within the threshold distance that indicates proximity to the user.

12. The method of claim 1, wherein tracking the attention of the user relative to the plurality of objects comprises a combination of two or more of monitoring (i) the distance between each of the plurality of objects and the user in the virtual space, (ii) a gaze path of the user, (iii) a direction of audio signal received by the user, or (iv) a direction of gesture by the user.

13. The method of claim 12, determining the one or more select objects for three-dimensional rendering comprises determining two or more of (i) the distance of each select object relative to the user is within the threshold distance and the select object is within the viewing range of the user, (ii) each select object is on the gaze path of the user for the time period exceeding the predefined threshold, (iii) each select object is along the direction of the audio signal, or (iv) each select object is along the direction of gesture.

14. The method of claim 1, further comprising monitoring, by the computing device, the data limit of the viewing device to determine the one or more select objects and the one or more remaining objects for rendering.

15. The method of claim 1, wherein the data limit of the viewing device is determined based on a frames-per-second capability of the view device.

16. A computerized system for visualizing a plurality of objects in a computerized visual environment, each of the plurality of objects is represented by a set of visualization data usable by the computerized system to provide three-dimensional visualization of the corresponding object in the computerized visual environment, the system comprising:
    a viewing device that displays, to a user wearing the viewing device, a virtual three-dimensional space, wherein the viewing device has a data limit for object rendering; and a computing device in electrical communication with the viewing device, the computing device comprises:
  a visualization module configured to present, via the viewing device of the user, an initial rendering of the plurality of objects within the virtual space, wherein the initial rendering comprises each of the objects rendered in a simple resolution such that not all visualization data for the object is used in the initial rendering and the visualization data used for the initial rendering does not exceed the data limit of the viewing device;
  a tracking module configured to track user attention relative to the plurality of objects as the user navigates through the virtual space, including compute a distance between each of the plurality of objects and the user in the virtual space and a viewing range of the user; and
  a computation module configured to automatically determine based on the tracking of user attention by the tracking module a plurality of select objects from the plurality of objects to which the user is paying attention, the plurality of select objects being located within the viewing range of the user for a time period exceeding a predefined length of time threshold and the computed distance of each select object relative to the user being within a threshold distance that indicates proximity to the user, and cause the visualization module to dynamically render (i) a set of the select objects as full three-dimensional objects using all the visualization data corresponding to each of the select objects and (ii) a set of remaining objects from the plurality of objects in the simple resolution compared to the rendering of the select objects such that not all visualization data for each remaining object is used in the dynamic rendering, wherein the visualization data used to render both the set of select objects and the set of remaining objects does not exceed the data limit of the viewing device by adding objects to or removing objects from the set of select objects in compliance with the data limit.

17. The computerized system of claim 16, wherein the simple resolution for rendering a remaining object comprises rendering the remaining object using only a portion of the visualization data of that object.

18. The computerized system of claim 16, wherein the simple resolution for rendering a remaining object comprises not rendering the remaining object at all.

19. The computerized system of claim 16, wherein the tracking module tracks the attention of the user relative to the plurality of objects by monitoring one or more of: (i) the distance between each of the plurality of objects and the user in the virtual space, (ii) a gaze path of the user, (iii) a direction of audio signal received by the user, or (iv) a direction of gesture by the user.

20. The computerized system of claim 19, wherein the computation module selects the one or more objects for three-dimensional rendering by determining at least one of (i) the computed distance of each select object relative to the user is within the threshold distance and the select object is within the viewing range of the user, (ii) each select object is on the gaze path of the user for the time period exceeding the predefined threshold, (iii) each select object is along the direction of the audio signal, or (iv) each select object is along the direction of gesture.

* * * * *

UNITED STATES PATENT AND TRADEMARK OFFICE
CERTIFICATE OF CORRECTION

| | |
|---|---|
| PATENT NO. | : 11,551,402 B1 |
| APPLICATION NO. | : 17/380757 |
| DATED | : January 10, 2023 |
| INVENTOR(S) | : David Martin et al. |

It is certified that error appears in the above-identified patent and that said Letters Patent is hereby corrected as shown below:

On the Title Page

Item (72) Inventors:
Jason Mcevoy, Boston, MA (US)
Should read:
Item (72) Inventors:
Jason Mcevoy, Wicklow, Ireland (IE)

Signed and Sealed this
Fourteenth Day of March, 2023

Katherine Kelly Vidal
*Director of the United States Patent and Trademark Office*